Figures 1, 2:
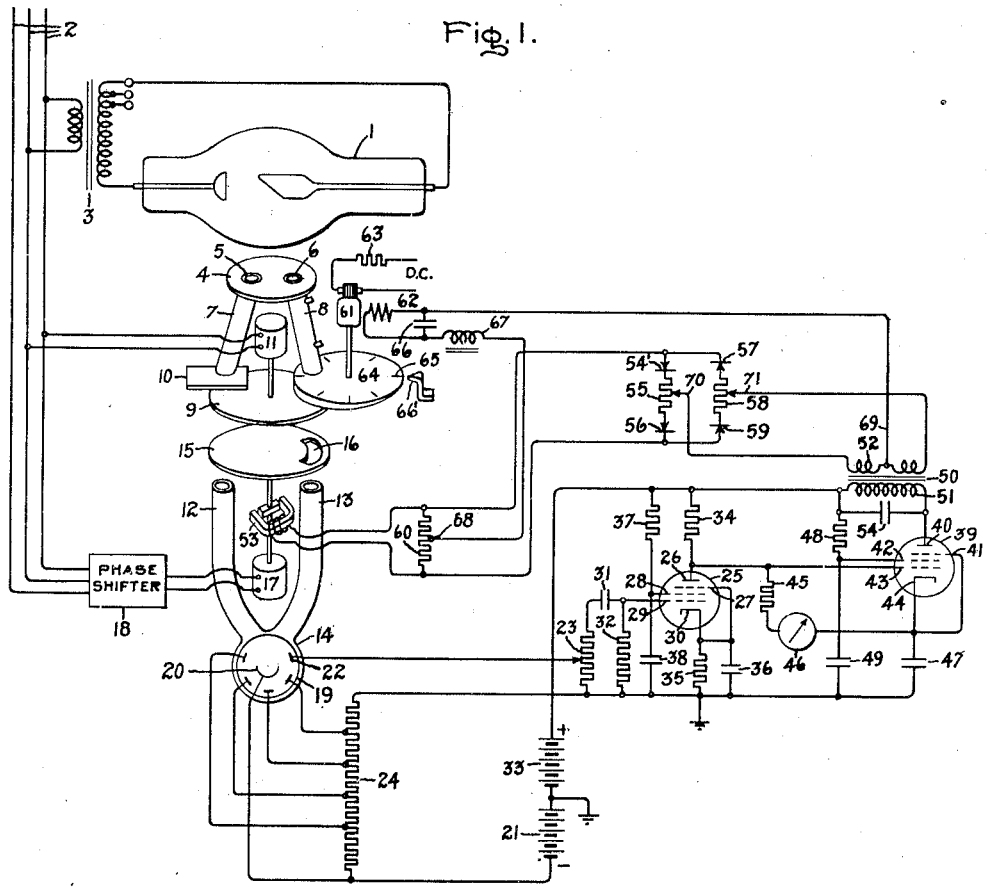

May 3, 1949.    T. A. RICH    2,469,206
X-RAY ABSORPTION PHOTOMETER

Filed Nov. 14, 1946    2 Sheets-Sheet 1

Inventor:
Theodore A. Rich,
by Prowell & Mack
His Attorney.

Patented May 3, 1949

2,469,206

UNITED STATES PATENT OFFICE 2,469,206

X-RAY ABSORPTION PHOTOMETER

Theodore A. Rich, Schenectady, N. Y., assignor to General Electric Company, a corporation of New York Application November 14, 1946, Serial No. 709,861

6 Claims. (Cl. 250—83.3)

My invention relates to X-ray absorption photometers and more particularly to X-ray absorption photometers of the absorption comparison type.

It is known that any substance, regardless of its physical state, gaseous, liquid or solid, will absorb X-rays to an extent dependent upon the atomic numbers of the elements constituting that substance and upon the quantity of each of these elements through which the X-rays must pass. Therefore, much may be learned about a substance by comparing its absorption to the absorption of X-rays by a known specimen. When possible it is desirable to use a known specimen which has approximately the chemical composition of the unknown.

However, absorption phenomena are also dependent upon the wavelength of the X-ray being absorbed. Long wavelength or "soft" X-rays are absorbed to a greater extent by any substance than are the short wavelength or "hard" X-rays. Furthermore, the change in degree of absorption with respect to change in wavelength cannot be easily expressed since all elements display the so-called K, L and M band absorption phenomena which may be briefly described as discontinuities caused by the atomic structure of the element under consideration. Therefore, it would be desirable when comparing the absorptions of two substances to use a monochromatic beam of X-rays, that is, a beam consisting of rays all of which have the same wavelength, selected so that this does not coincide with the K, L or M discontinuities.

For a fixed D.-C. value of anode-to-cathode voltage, X-ray tubes of the general type emit X-rays consisting of rays of many different wavelengths whose intensities are unequal. It is usual practice to consider this unequal intensity band spectra beam in terms of a monochromatic beam of proper intensity and wavelength which produces the same absorption characteristics as the actual beam. Practice also shows that the wavelength and intensity of such an equivalent beam changes if the anode voltage of the X-ray tube is altered only slightly since the intensity band spectra pattern is dependent upon the voltage applied to the tube. It is, therefore, necessary to use the same anode voltage or an identical sequence of anode voltages when comparing the absorptions of two different substances by any non-simultaneous method of comparison.

Various means for measuring absorption of X-rays in an unknown specimen are known to those skilled in the art. Means for comparing the absorption of X-rays by an unknown specimen to that by a known or standard specimen, with such X-rays supplied by a common source, are also known. Such a technique, however, requires accurate measurement of the unabsorbed X-rays passing through each specimen. In the past, separate X-ray measuring devices have been utilized for such measurements, and the desired information has been obtained by comparison and interpretation of the separate measured results.

Since, as is known in the art, a greater absorption contrast is possible when the intensity of the unabsorbed X-rays is made low by utilizing X-rays of as long a wavelength as practicable, it is necessary to utilize sensitive measuring devices. Such sensitive devices, however, are particularly subject to changes in calibration, and calibrations thereof are not easily accomplished. Therefore, errors of considerable magnitude may be introduced by a change in calibration of either, or both, of such measuring devices. It is, therefore, highly desirable to employ a device wherein the unabsorbed X-rays from each specimen may be measured in a single and common measuring device designed to produce a resultant dependent upon the degree of inequality of absorption through the specimens being analyzed. In using such comparison methods by a single measuring device, a change or error in calibration has no effect upon the accuracy of results obtained.

It is an object of my invention to provide improved means for analyzing substances by X-ray absorption comparison methods wherein errors caused by changes in the source of X-rays are minimized.

Another object of my invention is to utilize a single means for measuring the absorption of both substances, thereby eliminating inaccuracies otherwise introduced by unequal changes in sensitivity characteristics of separate measuring means as may be caused by changes in circuit elements, such as phototubes, thermionic tubes, resistances and the like.

It is a further object of my invention to provide improved absorption measuring means of the null type for use in an X-ray absorption photometer whereby inaccuracies in and the necessity for calibrating the measuring means are eliminated.

Figure 3:
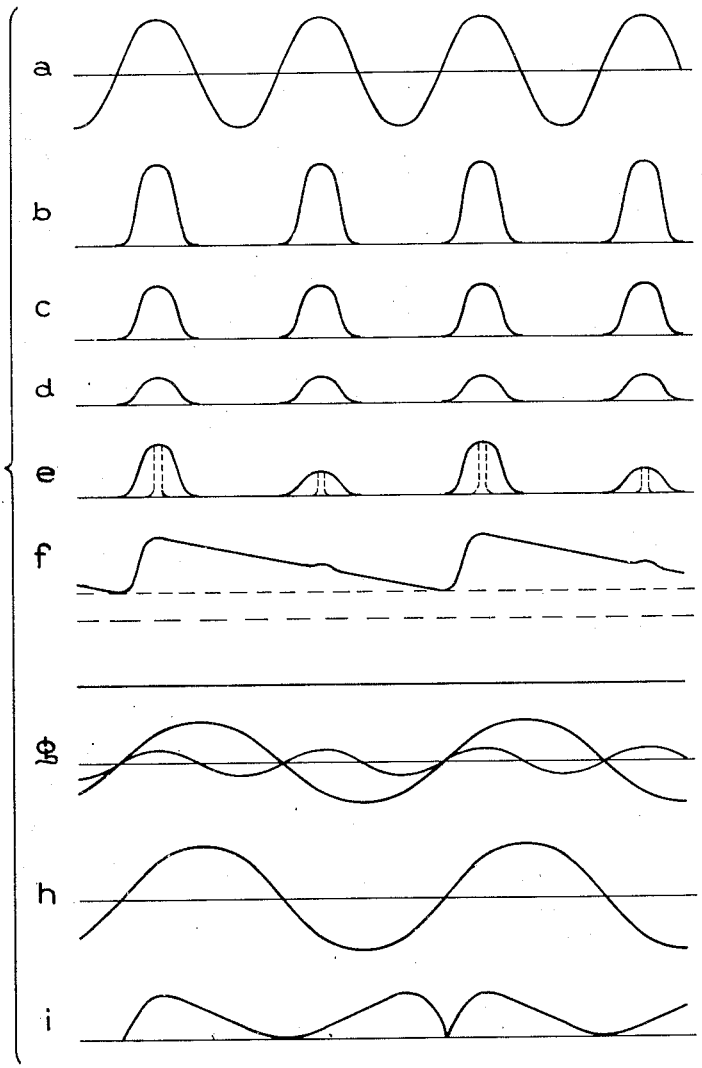

The features of the invention which are believed to be novel and patentable will be pointed out in the claims appended hereto. For a better understanding of the invention, reference is made in the following description to the accompanying drawing in which Fig. 1 shows an apparatus and circuit connections which may be employed in carrying my invention into effect when used in X-ray analysis of gases; Fig. 2 shows shutter disks which may be used for purposes to be described in place of the one shown in Fig. 1, and Fig. 3 represents a series of curves showing the operation of my invention as will be described later.

Referring to Fig. 1, the X-ray tube 1 may be energized from the three-phase source 2 by the single-phase transformer 3. A portion of an X-ray absorbing shield which may totally surround the tube is shown as 4 with apertures 5 and 6 through which X-rays may emerge. Tube 7, sealed at each end with gas-tight X-ray transparent windows, contains a standard specimen in gaseous form. Tube 8 of similar construction is fitted with an inlet and an outlet by which the gas to be analyzed may be introduced or circulated through the tube. Each tube is so positioned that X-rays may pass through it. Although apparatus for gas analysis is shown, it is apparent that specimens in solid state, such as sheets or plates, may be substituted for tubes 7 and 8 when analyzing solids. Unabsorbed X-rays emanating from tubes 7 and 8 are allowed to strike the transparent disk 9 whose surface is coated with very short persistence fluorescent material. Hence incident X-rays are here changed to light rays of a corresponding intensity and disk 9 with its fluorescent material becomes a light source energized by unabsorbed X-rays. If the rays from tube 7 striking disk 9 are of higher intensity than desired, a calibrated fixed attenuator or absorber 10 may be placed between tube 7 and disk 9.

Disk 9 is mounted for rotation with the shaft of motor 11. Motor 11, preferably of the asynchronous type, and supplied from two leads of the source 2 is provided for the purpose of compensating for any difference in the response characteristics of different portions of said screen.

Single means for measuring the illumination intensity at each of the two noncoincident portions of disk 9 are provided as described in a manner similar to that disclosed and claimed in the copending application Serial No. 709,739, filed November 14, 1946, of C. D. Moriarty and assigned to the assignee of this application. Light tunnels 12 and 13, with highly reflective walls, direct the light rays from the noncoincident portions of the disk 9 directly below tubes 7 and 8 to a phototube 19 with an enclosure 14. An opaque disk 15 contains a slot 16 whose mean radius is essentially one-half the distance between tubes 12 and 13. Slot 16 is preferably wider than or as wide as the openings in tubes 12 or 13. A synchronous motor 17 is provided to rotate disk 15 at a constant speed such that one revolution is made in the time required for two cycles of source 2. Motor 17 is supplied from source 2 through a phase shifter 18 whereby the rotational phase relationship of disk 15 with respect to the voltage supplied to X-ray tube 1 may be adjusted. The phase shifter can be eliminated by making disk 15 adjustable in angular relation to the rotor of motor 17.

The phototube 19 has its light sensitive cathode 20 biased negatively by a source of D.-C. voltage, such as battery 21. The anode 22 is connected to ground through the variable resistor 23. A potential divider resistor 24 may be used as shown if an electron multiplier phototube is utilized. A normally conducting thermionic tube 25 comprising anode 26, suppressor grid 27, screen grid 28, control grid 29, and cathode 30 amplifies and inverts the voltage variation across resistor 23 by capacitively coupling control grid 29 to resistor 23 through a condenser 31. Thus periodic current flow through phototube 19 in response to alternate light pulses through tubes 12 and 13 causes periodic negative voltage pulses on the control grid 29 of the tube 25, the magnitude varying with the X-ray and resulting light ray intensities. These negative voltage pulses applied to the control grid 29 of tube 25 reduce the current flow through the tube accordingly and periodically makes its plate voltage more positive. The usual grid leak resistance, such as 32, is provided. Anode voltage is supplied by a D.-C. source, such as a battery 33, through plate resistance 34. Suppressor grid 27 and cathode 30 are connected together and biased positively by means of resistor 35 and condenser 36 in parallel between cathode and ground. Screen grid 28 is connected to source 33 through resistor 37. A shunting capacity 38 is connected from screen grid 28 to ground.

An electronic circuit actuated by the voltage output of phototube 19 is provided as shown for obtaining a comparison between voltage output pulses of phototube 19 during alternate cycles of the X-ray tube voltage source. Such a circuit is described and claimed in an application by P. C. Michel, Serial No. 657,307, filed March 26, 1946, and assigned to the assignee of this application. A normally conducting thermionic tube 39 is employed in a peak comparator circuit whereby the alternate periodic voltage swings of plate 26 of tube 25 produced in response to X-ray pulses through the standard 7 are compared as to magnitude with intermediate voltage swings of plate 26 produced in response to X-ray pulses through the unknown 8. Control grid 43 of tube 39 is directly connected to anode 26 of tube 25. Cathode 44 and suppressor grid 41 of tube 39 are connected to anode 26 of tube 25 through serially connected resistor 45 and current measuring device 46. A condenser 47 is connected between cathode 44 and ground. Voltage from source 33 is applied to screen grid 42 through resistor 48. A shunting condenser 49 is provided between screen grid 42 and ground. The primary winding 51 of a transformer 50, shunted by condenser 54, is connected between anode 40 of tube 39 and the D.-C. source 33.

To permit proper rectification of the output voltage of the peak comparator tube, an alternator 53 of the same frequency as and in constant phase relationship with the output voltage of the peak comparator tube is provided. This is accomplished by mounting the rotor of the alternating-current generator 53 on the shaft of motor 17. A series circuit consisting of a rectifier 54', a center tapped resistor 55 and a rectifier 56 connected in the order named and allowing current flow in only one direction is connected across the output terminals of generator 53. A similar series circuit, rectifier 57, resistor 58 and rectifier 59, is also connected across the output terminals of generator 52 in such fashion that current flow is allowed only in the direction opposite to that through the first-named series circuit. A center tapped resistor 60 is also connected across the output terminals of generator 53. The secondary winding 52 of transformer 50 is connected between the adjustable center tap 70 of resistor 55 and the adjustable center tap 71 of resistor 58. A driving means for properly positioning a variable thickness X-ray absorption member in the path of an X-ray beam is shown as a motor 61. The armature of motor 61 is supplied with D. C. energy through a resistor 63. Its shunt field 62 is connected between the tap 68 on resistor 60 and a center tap 69 of the secondary coil 52 of transformer 50 through a filter circuit consisting of condenser 66 and choke coil 67. A variable thickness X-ray absorption disk 64 is mounted on the shaft of motor 61. Motor 61 is so positioned and supported that a portion of the disk 64 may absorb X-rays emanating from tube 8. Rotational position of disk 64 determines the degree of absorption because of its variable thickness. Its rotational position may be determined visually by reading markings 65 with respect to pointer 66'. The control of motor 61 by the peak comparator is such that the absorption disk 64 is automatically adjusted to cause the intensity of X-rays striking the two noncoincident portions of fluorescent disk 9 to be equal. Other indicating devices including remote indicators may be used but are not shown since they are not part of my invention.

The operation of the apparatus constructed according to my invention may more easily be explained by considering all portions properly energized including the cathode heater elements not shown and by reference to the curves shown in Fig. 3. Although the apparatus may be designed for use on other frequencies, assume that source 2 is a three-phase 60-cycle A.-C. source. X-ray tube 1 becomes conductive and emits X-rays (as represented by curve $b$ of Fig. 5) only when the anode is positive with respect to the cathode. Curve $a$ represents the single phase A.-C. voltage applied to the anode of X-ray tube 1.

Since the positive anode voltage varies from zero to maximum sinusoidally and similarly returning to zero, the mean effective wavelength and the intensity of the emitted X-rays change periodically during each positive half cycle of the impressed anode voltage. However, since immediately successive positive half cycles of the A.-C. voltage may be presumed essentially identical, X-ray emission characteristics of tube 1 follow a repeated pattern at least during short intervals of time as represented at $b$ of Fig. 3.

During these positive half cycles X-rays pass through tubes 7 and 8 and are absorbed therein to a degree dependent upon the amount, determinable by pressure and temperature factors, and absorbing characteristics of the gases contained in each. The unabsorbed X-rays as represented by curves $c$ and $d$ of Fig. 3 depicting unequal absorptions in the two paths strike the fluorescent material of the disk immediately below each tube causing these areas to emit light with an intensity varying with the intensity of X-rays impinging thereon and upon the response characteristics of the fluorescent material in the areas concerned. Any difference in light intensity caused by differences in response of different portions of the disk is a source of error unless the average or mean response characteristic is the same for X-rays leaving either tube 7 or tube 8. In the apparatus of my invention, averaging is assured by rotating disk 9 preferably asynchronously, so that each portion of the disk is subjected to X-rays from tube 7 and from tube 8 for equal but nonsimultaneous increments of time. Such rotation may be caused by driving means such as the asynchronous motor 11.

Only one of the two diametrically opposed illuminated spots on disk 9 are allowed to send light rays at any instant into the enclosure 14 in which is placed the light sensitive tube 19. This is accomplished by use of the shutter disk 15 which is rotated at a synchronous speed such that one light tunnel, say 13, receives the light rays during one cycle of the 60-cycle source and the other light tunnel 12 receives the light rays resulting during the next cycle. The synchronous motor 17 designed in this case to rotate at 1800 R. P. M., if a 60-cycle power source is used, may be utilized to drive disk 15. The phase shifter 18 allows adjustment such that the interval during which one light tunnel is being uncovered and the other being shielded may occur during a negative half cycle of the 60-cycle voltage during which time no X-rays are being produced. In this fashion phototube 19 is subjected to light of an intensity dependent upon the X-rays emerging from the standard specimen each alternate cycle of the 60-cycle source and is subjected to light of an intensity dependent upon the X-rays emerging from the test specimen during intermediate cycles. The resulting phototube current is represented by curve $e$ of Fig. 3 for unequal absorption as shown by curves $c$ and $d$. Furthermore, the phototube may be subjected to light from the fluorescent disk during only a portion of the time of a positive half cycle during which X-rays are incident upon it by using a slot in disk 15 of appropriate circumferential length.

Also, the time at which such time interval occurs with respect to the X-ray emission sequence of the X-ray tube may be adjustably controlled by means of the adjustable phase shifter 18. This may be represented for a particular setting of phase shifter and disk slot length by the dotted lines of curve $e$, Fig. 3.

The remainder of the apparatus is designed to automatically adjust the attenuator 64 until the light intensity during alternate cycles is equal to the light intensity during intermediate cycles. Equalization of light intensities is possible by properly positioning rotationally the variable thickness calibrated X-ray absorption disk 64. Since the degree of absorption of the disk is known, its rotational position for equal light intensities at the two noncoincidental portions of the fluorescent screen measures the difference in absorption between the known specimen and the test specimen. A fixed calibrated absorption member 10 may be used if it is necessary to bring the comparison apparatus within the automatic adjustment range of attenuator 64.

Automatic positioning of disk 64 results in the following manner. A pulse of varying light intensity strikes phototube 19 for each positive half cycle of X-ray tube anode voltage. Anode 22 is thereby driven negatively by current flow in resistor 23. A series of negative pulses appears across resistor 23, alternate pulses being of an amplitude dependent upon the light intensity caused by X-rays emerging from the known specimen and intermediate pulses being of an amplitude dependent upon the light intensity caused by X-rays emerging from the test specimen. These pulses are amplified and inverted in the normally conducting thermionic tube 25 and appear as positive pulses at plate 26 superimposed upon the normal or zero signal value of anode voltage.

With no signal impressed on resistor 23 the cathode 44 of the normally conducting tube 39 is at a voltage sufficiently above the voltage of anode 26 to allow the zero signal plate current of tube 39 to flow to ground through the path consisting of the ammeter 46, resistance 45, tube 25 and resistor 35. Condenser 47 is therefore normally charged to a corresponding value as represented by the lower dotted line of curve *f*, Fig. 3. If a series of positive pulses of equal magnitude are impressed upon control grid 43 as by negative signals at resistance 23 the average voltage across condenser 47 becomes still higher but does not exceed the plate supply voltage. This is represented by the upper dotted line of curve *f* of Fig. 3. This results since the capacity of condenser 47 is so chosen that the cathode 44 is allowed to follow the voltage increase of the control grid but is not permitted to follow the control grid voltage decrease because of the large time constant of the RC circuit consisting of condenser 47 and its discharge path through ammeter 46, resistance 45, tube 25, and resistor 35. However, since condenser 47 discharges to some extent between positive pulses of the control grid, the voltage across condenser 47 contains an A. C. component as represented by the small amplitude curve of curve *g* of Fig. 3, which has a frequency equal to the control grid positive pulse frequency. If, however, a series of positive pulses in which alternate pulses are all of one magnitude and intermediate pulses are all of another magnitude, are impressed on the control grid 43 of tube 39, the voltage across condenser 47 varies essentially as shown by curve *f* of Fig. 3. If these positive pulses occur 60 times per second, for example, it can be shown that the condenser voltage shown by curve *f*, Fig. 3, contains in addition to a constant D. C. value, a 60-cycle component, a 30-cycle component and minor components of higher harmonics of a 60-cycle A. C. voltage as represented by curve *g*, Fig. 3. Furthermore, it is evident from the action of tube 39 as previously explained and by reference to curves *e* and *f* of Fig. 3 that the 30-cycle component varies in magnitude with the difference in magnitude between alternate pulses and intermediate pulses. The positive half of the 30-cycle A. C. component will occur at or near the time of the greater positive pulse and the negative half cycle occurs at or near the time of the next following smaller positive pulse. Thus, this component is always positive at the time the phototube is being influenced by the greater of the two unequal light intensities and approaches zero when the light intensities become equal.

Having analyzed the voltage variation at condenser 47 its current requirements can be ascertained. It is known that a sinusoidal variation of voltage across a condenser requires a sinusoidal variation of current of equal frequency. Thus, in the present case, condenser 47 requires a current containing a 60-cycle component, a 30-cycle component and relatively small components of the harmonics of 60 cycles. These components must be supplied by the plate circuit of tube 39. The plate circuit must also supply the current flowing in the discharge path through ammeter 46, resistance 45, tube 25 and resistor 35 which current however is essentially direct current with only a negligible A. C. component.

The plate circuit of tube 39 contains the impedance represented by the transformer 50 shunted by the condenser 54. The capacity of condenser 54 is so chosen that the plate circuit impedance is larger for a 30-cycle current than for a current at any other frequency. In other words, resonance of the parallel circuit consisting of the transformer and condenser is made to occur at 30 cycles. Thus the transformer voltage is an A. C. voltage containing a predominant 30-cycle component, a small 60-cycle component and negligible components of higher harmonics. Furthermore, the amplitude of the voltage appearing across the secondary winding 52 of transformer 50 is a measure of the difference between X-ray absorption by the known specimen and by the test specimen and its phase relationship is determined by which of the two light intensities, if unequal, is the greater.

If the average voltage across condenser 47 approaches too closely the value of the source voltage 36, clipping action will result whereby the condenser 47 voltage cannot vary in accordance with the maximum value of the voltage pulses supplied by anode 26. In this case, the charge on condenser 47 will not vary in accordance with the difference in amplitudes of one positive pulse and the next immediately succeeding positive pulse. Since current device 46 is a serial part of the discharge path of condenser 47, its indication is a measure of the average voltage on condenser 47. It is only necessary, therefore, to adjust resistor 23 until a determinable limiting value of current through device 46 is not exceeded and the apparatus again becomes properly operative.

The voltage across the secondary winding 52 is rectified in the following manner. Generator 53 supplies an A.-C. voltage which has a frequency equal to that of the voltage across the secondary 52. Also, it is caused to be either in phase or 180° out of phase with the transformer secondary voltage by proper positioning of the permanent magnet rotor of generator 53 on the shaft of motor 17. This voltage is represented by curve *h* of Fig. 3. Assume the instantaneous polarities of the voltages are such that rectifier 54' is positive with respect to 56 and the tap 71 is positive with respect to tap 70. Rectifiers 54' and 56 are then conductive and taps 68 and 70 are at the same potential or are made so by adjustment of tap 70. Thus, tap 69 is positive with respect to tap 68. When both polarities have reversed, rectifiers 57 and 55 become conductive and taps 68 and 71 are at the same potential or are made so by adjustment of the latter tap. At this instant tap 69 is positive with respect to 71 and therefore also positive with respect to 68. Therefore, a full-wave rectified D.-C. voltage results between 69 and 68 with the former point at positive potential. This rectified voltage is represented by curve *i* of Fig. 3. If the phase relationship of the transformer voltage shifts from in phase to 180° out of phase with respect to the generator 53 voltage it may be shown similarly that 68 becomes positive with respect to 69 and hence the voltage *i* will reverse. The magnitude of the resulting D. C. voltage is entirely independent of the magnitude of the generator 53 voltage and dependent only upon the phase relation and magnitude of the voltage introduced between taps 70 and 71.

The field 62 of motor 61 is supplied through a filter circuit consisting of condenser 65 and choke coil 67 by the rectified D. C. voltage which varies in magnitude and polarity with the ratio of light intensities. An essentially constant unidirectional current is supplied to the motor 61 armature. Thus, when an unbalance in light intensities exists, motor torque results which causes rotation in the proper direction to increase or decrease the absorption in attenuator 64 as required. Suitable torque amplifying means or means energized from a power source and controlled by the rectified D. C. voltage output across leads 68 and 69 may be employed if greater torque is desired in motor 61. When a balance is reached motor torque is zero. Suitable antihunting means may be employed in connection with motor 61. The rotational position of rest which the attenuator 64 automatically seeks is therefore a measure of the ratio of absorption in a known specimen to that in a test specimen.

As is shown in Fig. 1, disk 15 has a circular slot 16 whose arc is less than a semi-circle. If the slot extends through a physical angle of, say, 15 degrees, only those X-rays produced during a 30 electrical degree time interval will be allowed to influence the output of phototube 19. Any 30-degree time interval out of the 180-degree positive X-ray anode voltage may be chosen by proper adjustment of the phase shifter 18. For reasons already given, it may be desirable to use X-rays emitted only when the X-ray anode voltage is at or near maximum value or during a time interval when the mean effective wavelength and intensity remains essentially constant. By using a shutter such as disk 15 this is easily accomplished by the apparatus of my invention. If X-rays emitted at a different but essentially constant anode voltage are desired the ratio of transformer 3 may be made adjustable as by multiple taps or other means in series with the transformer. A disk 15' having a slot 16' extending over a half circle as shown at $a$ Fig. 2 may be used in place of disk 15 of Fig. 1. Operation of the apparatus will remain essentially the same as already described except that, as is apparent by reference to the solid line curve $e$ Fig. 3, the light pulses will be of longer time duration. However, the output voltage of curve $i$, Fig. 3 will remain essentially the same in characteristic.

By further reference to Fig. 3 it is also evident that an X-ray tube operating from an essentially constant D. C. source may be employed with the apparatus of my invention. By appropriate design of the shutter disk 15 the phototube current can be made to correspond essentially to that shown in curve $e$ of Fig. 3, as by a disk as shown in Fig. 2b, or to any other desired pattern while still retaining the characteristic dependent upon unequal X-ray absorption in the two noncoincident absorption paths where D. C. or A. C. is used as a source for the X-ray tube. As long as this characteristic is retained the apparatus will function properly.

As will occur to those skilled in the art, various different arrangements and combinations of the principles described above may be employed without departing from the true spirit and scope of the invention and I, therefore, do not wish to limit my invention to the particular arrangement described.

What I claim as new and desire to secure by Letters Patent of the United States is:

1. In a photometer, a source of radiant energy, a rotatable fluorescent screen responsive to incident radiant energy, means for rotating said screen for the purpose of compensating for any difference in the response characteristics of different portions of said screen, means for directing radiant energy to two non-coincident portions of said fluorescent screen, and means responsive to the relative light intensities at said two portions for equalizing the intensity of the incident radiant energy upon said portions.

2. In an X-ray absorption photometer, a source of X-rays, a rotatable fluorescent screen responsive to incident X-rays, means for rotating said screen for the purpose of compensating for any difference in the response characteristics of different portions of said screen, means for directing X-rays to two noncoincident portions of said fluorescent screen, and means responsive to the relative light intensities at said two portions for equalizing the intensity of the incident X-rays upon said portions.

3. In combination, a source of X-rays, means for directing two X-ray beams along individual paths, X-ray absorbing means in each path, a rotatable fluorescent screen responsive to incident X-rays positioned to intercept unabsorbed X-rays of each path at noncoincident portions of the screen, means for rotating said screen, light intensity measuring means, shielding means rendering said light intensity measuring means subject only to illumination supplied by said fluorescent screen, shutter means for alternately exposing said light sensitive means to the two noncoincident illuminated portions of said fluorescent screen, and means operative by unbalance of light intensities at said two portions of the fluorescent screen as measured by said light intensity measuring means to equalize the amount of X-ray absorption in the said absorption paths.

4. In combination, a source of X-rays, two gas-tight absorption chambers fitted with X-ray transparent oppositely disposed walls, a rotatable fluorescent screen responsive to X-rays, means for rotating said screen, means for directing X-ray beams from said source through said chambers onto two noncoincident portions of said fluorescent screen, a variable X-ray absorbing member adapted to be moved into the path of X-rays through one of said chambers, means alternately responsive to light intensities at the said two portions of said fluorescent screen to move said absorbing member to a position causing equal light intensities at both of said portions of said fluorescent screen, and means actuated by said movable absorption member for indicating its position.

5. An apparatus for comparing the absorption of X-rays by two specimens comprising a source of X-rays, means for directing a portion of the X-rays from said source through a specimen to be analyzed and a second essentially similar portion of the X-rays through a second specimen, a graduated adjustable absorption member adapted for movement intercepting the X-rays through one of said specimens, a rotatable fluorescent screen adapted to intercept unabsorbed X-rays passing through one specimen by one portion thereof and the unabsorbed X-rays through both the other specimen and said adjustable absorption member by another noncoincident portion thereof, driving means therefor, a phototube, an enclosure for said phototube allowing its actuation only by light produced by said fluorescent screen, shutter means for alternately exposing said phototube to light from one portion of said fluorescent screen and to light from another portion of said screen, driving means therefor, means responsive to phototube current for positioning said adjustable absorption member for equal illumination of said two portions of the fluorescent screen, and means responsive to position of said adjustable absorption member for indicating its position.

6. In combination, an A. C. source of power, an X-ray tube connected to receive power from said A. C. source, means for directing a portion of the X-rays from said X-ray tube through a specimen to be analyzed and a second essentially similar portion of the X-rays through a second specimen, a graduated adjustable absorption member adapted for movement intercepting the X-rays through one of said specimens, a rotatable fluorescent screen adapted to intercept unabsorbed X-rays passing through one specimen by one portion thereof and the unabsorbed X-rays passing through both the other specimen and said adjustable absorption member by another noncoincident portion thereof, driving means therefor, a phototube, an enclosure for said phototube allowing its actuation only by light produced by said fluorescent screen, shutter means for alternately exposing said phototube to light from one portion of said fluorescent screen and to light from another portion of said screen, said shutter means adapted to allow said exposures during only a selected portion of the time duration of each cycle of said A. C. source, an A. C. synchronous motor for driving said shutter means, a phase shifting device, said motor adapted to be supplied from said A. C. source through said phase shifting device and means responsive to phototube current for positioning said adjustable absorption member for equal illumination of said two portions of the fluorescent screen.

THEODORE A. RICH.

REFERENCES CITED

The following references are of record in the file of this patent:

UNITED STATES PATENTS

| Number | Name | Date |
|---|---|---|
| 788,151 | Hall | Apr. 25, 1905 |
| 1,894,132 | Stone | Jan. 10, 1933 |
| 1,961,713 | Simjian | June 5, 1934 |
| 2,094,318 | Failla | Sept. 28, 1937 |
| 2,203,352 | Goldmark | June 4, 1940 |
| 2,264,725 | Shoupp et al. | Dec. 2, 1941 |
| 2,319,898 | Zurian | May 25, 1943 |
| 2,350,001 | Van Den Akker | May 30, 1944 |
| 2,376,311 | Hood | May 15, 1945 |

OTHER REFERENCES

X-Rays, by G. W. C. Kaye, 4th edition, 1923, published by Longmans, Green, and Co.